(12) United States Patent
Axnäs et al.

(10) Patent No.: US 8,243,758 B2
(45) Date of Patent: Aug. 14, 2012

(54) METHOD AND ARRANGEMENT IN A COMMUNICATIONS SYSTEM

(75) Inventors: Johan Axnäs, Solna (SE); Niklas Johansson, Sollentuna (SE); Johan Nyström, Stockholm (SE); Per Skillermark, Stockholm (SE); Kai-Erik Sunell, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 853 days.

(21) Appl. No.: 12/301,579

(22) PCT Filed: May 19, 2006

(86) PCT No.: PCT/SE2006/000584
§ 371 (c)(1), (2), (4) Date: Nov. 19, 2008

(87) PCT Pub. No.: WO2007/136306
PCT Pub. Date: Nov. 29, 2007

(65) Prior Publication Data
US 2009/0109902 A1   Apr. 30, 2009

(51) Int. Cl.
*H04J 1/00* (2006.01)
(52) U.S. Cl. ...................................................... 370/480
(58) Field of Classification Search .................. 370/241, 370/248, 252, 310, 328, 329, 330, 343, 431, 370/436, 464, 478, 480, 481, 351, 389, 392; 455/39, 59, 61, 62, 67.11, 68, 70, 71, 91, 103, 105, 113, 130, 150.1, 160.1, 161.1, 168.1, 188.1, 192.1, 192.3, 205, 216, 227
See application file for complete search history.

(56) References Cited

U.S. PATENT DOCUMENTS

| | | | | |
|---|---|---|---|---|
| 5,993,631 A | * | 11/1999 | Parton et al. | 204/547 |
| 7,386,621 B1 | * | 6/2008 | Hlasny | 709/230 |
| 2001/0031022 A1 | * | 10/2001 | Petrus et al. | 375/324 |
| 2002/0172146 A1 | * | 11/2002 | Wu et al. | 370/208 |
| 2003/0122619 A1 | * | 7/2003 | Ishida et al. | 330/124 R |
| 2004/0137866 A1 | * | 7/2004 | Miyamura | 455/185.1 |
| 2005/0232194 A1 | * | 10/2005 | Hanna et al. | 370/329 |
| 2006/0188031 A1 | * | 8/2006 | Liu | 375/260 |
| 2007/0097853 A1 | * | 5/2007 | Khandekar et al. | 370/208 |
| 2007/0211757 A1 | * | 9/2007 | Oyman | 370/468 |

* cited by examiner

*Primary Examiner* — Derrick Ferris
*Assistant Examiner* — Omar Ghowrwal

(57) ABSTRACT

The object of the present invention is to provide a mechanism for a more efficient carrier search. The object is achieved by a method for sending a signal in a first node. The first node communicates with a second node via radio communication, which radio communication is performed by multi carrier transmission. The first node uses a carrier, being associated with a frequency range. The method comprises the step of transmitting an end-marker signal within or close to the frequency range. The end-marker signal is intended to be received and used by the second node for identifying the frequency range of the used carrier.

18 Claims, 4 Drawing Sheets

METHOD AND ARRANGEMENT IN A COMMUNICATIONS SYSTEM

TECHNICAL FIELD

The present invention relates to a method and arrangement in a first node, and a method and arrangement in a second node. In particular the present invention relates to a second node identifying by carrier search a frequency range of a carrier used by a first node by carrier search.

BACKGROUND OF THE INVENTION

Many radio communication systems are able to operate at several different frequency bands. Hence, when a user terminal is switched on, it has to search for the frequencies that are used in the geographical area where it is located. In theory this could be a time-consuming process, but in practice, it is usually not a problem, since there are normally only a limited number of frequencies to scan for in a particular radio communication system such as e.g. GSM or Bluetooth.

The process is even further simplified by the fact that within a certain geographical area (e.g. a country) there is typically only a subset of frequency bands in use, and the user terminal may be hardwired for those particular frequency bands. Also, when switched on, the likelihood is large that the same frequencies that were used the last time the user terminal was connected to a network are still the ones to use, and the user terminal can start the search with these frequencies for fast results.

There is also a possibility to use a beacon signal that has a fixed frequency in all cases. This is mentioned in the paper "*Spectrum Management Methodology*" by Andy McGregor. The paper appears in Universal Personal Communications 1993. '*Personal Communications: Gateway to the 21$^{st}$ Century*'. Conference Record., 2$^{nd}$ International Conference on. Publication date 12-15 Oct. 1993, volume 1, on pages 476-479 vol. 1. This paper mentions the use of a control "beacon" which may indicate that the x MHz above or below the frequency used by the control beacon is available for use. In this case the frequency bands are however fixed and the user terminal is aware of the different possibilities of frequency bands, therefore the terminal knows where to look for the beacon channel. The problem appears when the frequency bands are not fixed and the only thing that is known is the spectrum range that has to be scanned in its entirety.

Although the problem of finding the frequencies to use is simple in most traditional systems, usage of very flexible and/or fragmented spectrum potentially to be used in multi carrier systems, may present several difficulties. Systems using multi carrier transmission include e.g. IEEE 802.11, IEEE 802.16, IEEE 802.20, HiperLAN2, Universal Mobile Telecommunications System Long Term Evolution/System Architecture Evolution (UMTS LTE/SAE)) and radio interface proposals such as Wireless World Initiative New Radio (WINNER) concept. In a multi-carrier system the transmission bandwidth, i.e. the carrier is divided into a number of sub-carriers, which are typically arranged to be orthogonal or near orthogonal. The signals modulated on the subcarriers can thus be transmitted in parallel. There are two main reasons why the number of candidate carriers to search for may be large in such future systems: Firstly, due to possible regulatory requirements on spectrum flexibility, the total frequency range where such a system may operate may be very large, perhaps 1-6 GHz or even wider; Secondly, one advantage of multi-carrier systems is that it is simple to vary the system bandwidth by activating different number of sub-carriers. This means that it is important to establish where in the wide frequency range the system operates, but also to establish the actual bandwidth used.

There are potentially a large number of possible bandwidths. Since the multi-carrier system may be designed to utilize large and small unused "holes" in the radio spectrum, there will not necessarily be any specific frequency slots for a given bandwidth. For example, 10 MHz carriers will not necessarily be found only on frequencies that are integer multiples of 10 MHz. The situation is further complicated if fragmented spectrum is employed, i.e. if the spectrum used is composed of two or more frequency ranges. NB it may be sufficient that one of these frequency ranges are detected to be able to identify the network.

The following examples show that when there are many possible combinations of bandwidths and many possible locations of the carrier, the search effort will be very time consuming. Assuming 6 possible carrier bandwidths {2.5 MHz, 5 MHz, 10 MHz, 20 MHz, 50 MHz, 100 MHz} and 5000 possible locations of the carrier within 1-6 GHz and a spacing of 1 MHz, there are in total 6×5000=30000 search candidates. With a candidate test time interval of 10 ms, the worst-case time for identifying the network could be about 300 seconds, which may be deemed unacceptable. When the number of combinations are considerably smaller, as in most current systems, this is not a significant problem.

The search needs not necessarily only be performed when the user terminal is powered up. With a multitude of both licensed spectrum for wide area coverage and license-free spectrum for private local use, e.g. indoors, for personal area networks etc), a new scan may have to be performed very often in order to ensure optimal interruption-free connection (e.g. when entering a building where there is no outdoor-to-indoor coverage, but only a private hotspot).

SUMMARY OF THE INVENTION

It is therefore an object of the present invention to provide a mechanism for a more efficient carrier search when radio communication is performed by multi carrier transmission.

According to a first aspect of the present invention, the object is achieved by a method for sending a signal, in a first node. The first node communicates with a second node via radio communication, which radio communication is performed by multi carrier transmission. The first node uses a carrier, being associated with a frequency range. The method comprises the step of transmitting an end-marker signal within or close to the frequency range. The end-marker signal is intended to be received and used by the second node for identifying the frequency range of the used carrier.

According to a second aspect of the present invention, the object is achieved by an arrangement in a first node. The first node is adapted to communicate with a second node via radio communication which radio communication is adapted to be performed by multi carrier transmission. The first node uses a carrier, being associated with a frequency range. The first node arrangement comprises a transmitter adapted to transmit an end-marker signal within or close to the frequency range. The end-marker signal is intended to be received and used by the second node for identifying the frequency range of the used carrier.

According to a third aspect of the present invention, the object is achieved by a method for managing a carrier search in a second node. The second node communicates with a first node via radio communication, which radio communication is performed by multi carrier transmission. The first node uses a carrier, being associated with a frequency range. The method comprises the step of receiving an end-marker signal within or close to the frequency range. The end-marker signal is transmitted by the first node and is intended to be used by the second node for identifying the frequency range of the used carrier.

According to a fourth aspect of the present invention, the object is achieved by an arrangement in a second node. The second node is adapted to communicate with a first node via radio communication, which radio communication is adapted to be performed by multi carrier transmission. The first node uses a carrier, being associated with a frequency range. The second node arrangement comprises a receiver adapted to receive an end-marker signal within or close to the frequency range, which end-marker signal is transmitted by the first node and is intended to be used by the second node for identifying the frequency range of the used carrier.

Since the first node transmits an end-marker signal within or close to the frequency range, which end-marker signal is received by the second node, the second node gets a hint of where to start search for the frequency range used, and since this is a simple and rapid process, the carrier search is performed more efficient.

An advantage with the present invention is that it drastically reduces the search efforts for the user terminal.

A further advantage with the present invention is that it enables fast and simple synchronization in a radio system with many potential carrier frequencies and bandwidths.

DETAILED DESCRIPTION OF PREFERRED EMBODIMENTS

The invention is defined as a method and an arrangement which may be put into practice in the embodiments described below.

Figure 1:
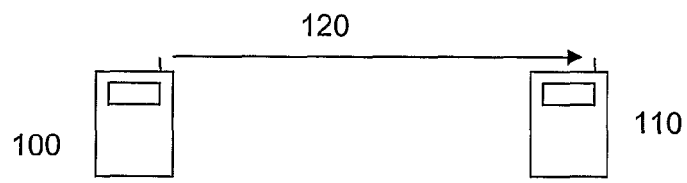
FIG. 1 is a schematic block diagram illustrating a first node communicating with a second node.

FIG. 1 shows a first node 100 communicating with a second node 110 via radio communication, which radio communication is performed by multi carrier transmission. The first and second nodes 100 and 110 are in this example in the form of user terminals, but may be any other node that is equipped with a radio transceiver such as e.g. a base station, an access point, a relay node or, in a peer-to-peer or ad hoc network, a user terminal.

The first node 100 uses a carrier, being associated with a frequency range. The first node 100 uses the associated frequency range for data communication via radio with other nodes, i.e., the frequency range is used for transmission of data to other nodes but may also be used for reception of data from other nodes. The first node 100 transmits one or more signals within or close to the utilized frequency range. This signal, received by the second node 110 provides for an efficient frequency band search for the second node 110, that requires identifying the frequency bands that are used by the first node 100. This signal will henceforth be called an end-marker signal. An example of such a signal is one or a set of sub-carriers on which continuous or intermittent signals are transmitted.

In this example, the end-marker signal is transmitted by the first node 100 and is received by the second node 110, this method step is pointed out by the arrow 120 in FIG. 1. One example of this first embodiment is a first node 100 and second node 110 being in a master/slave relationship, the master sending the end-marker signal to inform the receiving slave which frequency range the master works in.

Figure 2:
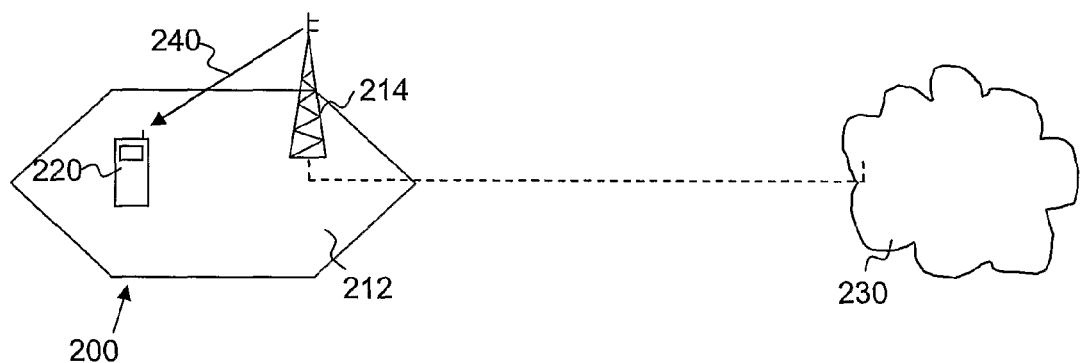
FIG. 2 is a schematic block diagram illustrating a radio network.

FIG. 2 depicts an exemplary scenario of a radio network 200. The radio network 200 uses technologies such as e.g. IEEE 802.11, IEEE 802.16, IEEE 802.20, HiperLAN2, Universal Mobile Telecommunications System, Long Term Evolution /System Architecture Evolution (UMTS LTE/SAE) and the proposed Wireless World Initiative New Radio (WINNER) concept, which uses a multi carrier technique such as e.g. Orthogonal Frequency Division Modulation (OFDM) for data transfer.

The radio network 200 comprises a number of cells whereof one cell 212 is depicted in FIG. 2. The radio network 200 further comprises a first node being associated with the cell 212. The first node in the example depicted in FIG. 2 is in the form of a base station 214 but it may be any node that is equipped with a radio transceiver.

The multi carrier system uses a number of subcarriers. This number is however not necessarily known in advance by the second node and hence the occupied frequency band is unknown. A frequency band is in this document defined as a range of frequency that is limited by a frequency value at the lower end of the range and a frequency value at the upper end of the range, which frequency band is associated with a carrier, which carrier is to be used by the base station 214 for radio communication. The base station 214 communicates with a second node via radio communication, which second node in this exemplary scenario is a user terminal 220.

One or more user terminals 220 are located within the radio network 200. Via the radio network 200 the terminals are connectable to the infrastructure network 230 such as e.g. the Public Switched Telephone Network (PSTN), an IP network or a radio network for data transmission over a carrier. The user terminal 220 may be a personal digital assistant (PDA), a laptop computer or any type of devices capable of communicating via radio resources.

The base station 214 transmits one or more end-marker signals within or close to the utilized frequency range. This end-marker signal is received by the user terminal 220 and provides for an efficient frequency band search for the user terminal 220 that requires identifying the frequency bands that are used in the geographical area.

In this example, the end-marker signal is transmitted by the base station 214 and is received by the user terminal 220, this method step is pointed out by the arrow 140 in FIG. 1.

Figure 3:
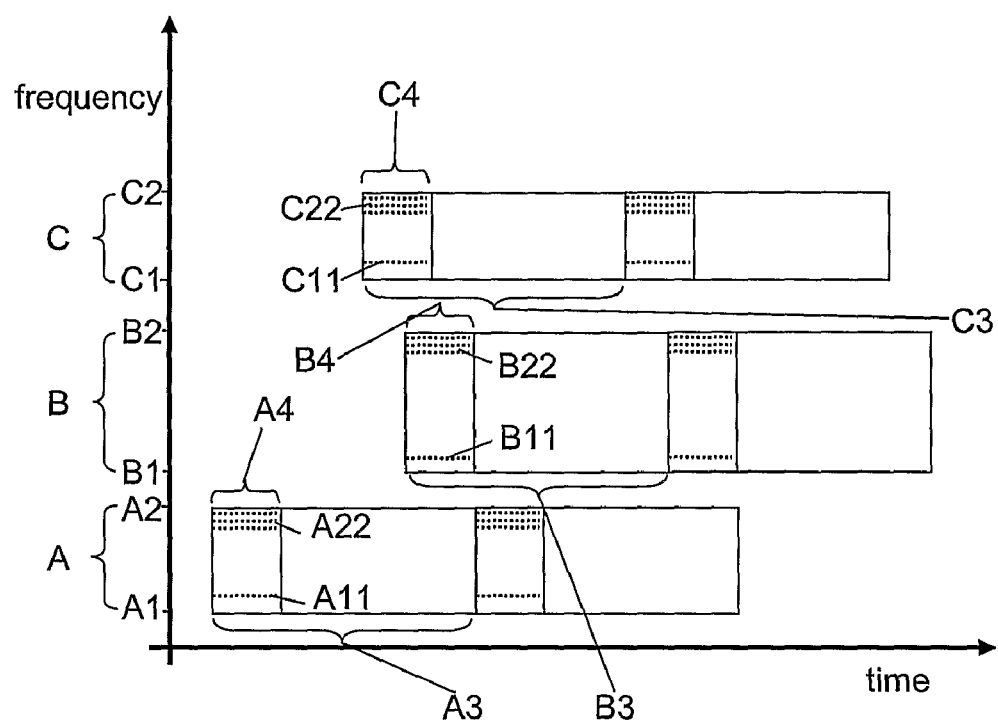
FIG. 3 is a schematic diagram illustrating an exemplary scenario of transmitting signals.

FIG. 3 is a diagram illustrating an exemplary scenario. The longitudinal axis indicates time and the lateral axis indicates frequency. In this exemplary scenario there are three different first nodes transmitting end-marker signals, a first base station, a second base station and a third base station, but it may be any other node that is equipped with a radio transceiver. In the general case, one first node may be associated with several frequency ranges or several first nodes may be associated with the same frequency range. I.e. in some cases there may be more frequency ranges than nodes and in other cases more nodes than frequency ranges. In this case multi carrier transmission is used within three frequency ranges with different bandwidths, a first frequency range A, used by the first base station, which first frequency range A has a bandwidth ranging from a lower frequency end A1 to an upper frequency end A2, a second frequency range B, used by the second base station, which second frequency range B has a bandwidth ranging from a lower frequency end B1 to an upper frequency end B2 and a third frequency range C, used by the third base station, which third frequency range C has with a bandwidth ranging from a lower frequency end C1 to an upper frequency end C2. All three frequency bands A, B and C in this example uses the same type of frame format, A3, B3 and C3, but the different bands A, B and C are not necessarily synchronized in time. Each of the respective first, second and third base station uses part of a respective preamble A4, B4 and C4 of a respective frames A3, B3 and C3 for transmitting a first end-marker signal A11, B11 and C11 at or close to the lower end of the respective frequency range A, B and C and a second end-marker signal A22, B22 and C22 at or close to the upper end of the respective frequency range A, B and C. Note that the diagram is not according to scale, e.g. the preambles A4, B4 and C4 are made disproportionate large. The end-marker signal constellation is preferably different at the lower and the upper end of the frequency range to simplify the distinction between the lower from the upper end-marker signals. This may e.g. be performed by the respective first end-marker signal A11, B11 and C11 being composed by a single end-marker signal and the second end-marker signal A22, B22 and C22 being composed by three end-marker signals, as depicted in FIG. 3.

The number and pattern of end-marker signals may of course be different from what illustrated in FIG. 3. In another embodiment, the end-marker signals are the same at the upper and lower end, but different in between different nodes.

An alternative way to simplify the distinction between the lower from the upper end-marker signals would be to utilize "signal hopping" by sending the first end-mark signal and the second end-mark signal at different subcarriers; e.g. the upper end of the spectrum may be indicated by only transmitting a single end-marker signal, but alternately on the uppermost and the second uppermost subcarrier in the multi carrier system. This technique may also be used to reduce the number of simultaneous signals and allow for larger power boost of the remaining signals. Note that in FIG. 3 references are only indicated in the first time frame of two shown in each reference band, the respective second timeframe is however a repetition of the first one.

Figure 4:
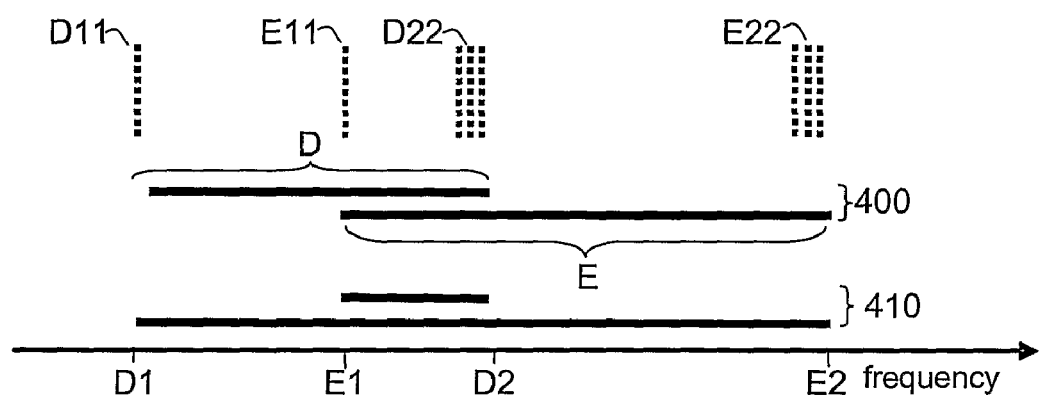
FIG. 4 is a schematic diagram illustrating another exemplary scenario of transmitting signals.

In the case of overlapping frequency ranges, the frequency identification process might be ambiguous, as illustrated in FIG. 4. This type of ambiguities may occur e.g. at the border between two countries where the frequency allocations can be different due to regulatory reasons. FIG. 4 is a diagram illustrating the exemplary scenario of overlapping frequency ranges. In this exemplary scenario there are two different first nodes transmitting end-marker signals, a first base station and a second base station, but it may be any other node that is equipped with a radio transceiver. The end-marker signals, transmitted within or close to respective frequency ranges, may further be transmitted from several first nodes since a frequency range may be associated with one or several nodes. In this single axis diagram the longitudinal axis indicates frequency. In this scenario two multi carrier systems use two different frequency ranges (the fourth and fifth exemplary frequency range in this document) with overlapping bandwidths, a fourth frequency range D, used by the first base station, which fourth frequency range D has a bandwidth ranging from a lower frequency end D1 to an upper frequency end D2 and a fifth frequency range E, used by the second base station, which fifth frequency range E has a bandwidth ranging from a lower frequency end E1 to an upper frequency end E2, which fourth and fifth frequency ranges are indicated as 400 in FIG. 4. The first base station belonging to one network transmits one end-marker signal D11 at or close to the lower end D1 and three end-marker signals D22 at or close to the upper end D2 of the fourth frequency range D, and further, the second base station belonging to another network transmits one end-marker signal E11 at or close to the lower end E1 and three end-marker signals E22 at or close to the upper end E2 of the fourth frequency range E. In this exemplary scenario, the frequency range identification might be misinterpreted by the second node that receives the transmitted end-marker signals D11, D22, E11, E22. A such misinterpretation may be that one frequency range ranges from lower end DI of the fourth frequency range D to upper end E2 of the fifth frequency range E and another frequency range ranges from lower end E1 of the fifth frequency range E to upper end D2 of the fourth frequency range D, which misinterpretation is indicated as 410 in FIG. 4. This ambiguity is, however, not a major problem, since the user terminal 220 may simply try the different, rather few possibilities until the correct frequency ranges are found. The ambiguity may also be mitigated by using different hopping patterns for end marker-signals of different carriers such that a specific carrier has a specific hopping pattern that is different from hopping patterns used for end-marker signals of other carriers. For example, end-marker signals D11 and D22 may use predefined pseudo-random hopping sequence which associates D11 with D22 and end-marker signals E11 and E22 may use predefined different pseudo-random hopping sequence which associates E11 with E22. Moreover, the ambiguity may be resolved easily in case the two networks are not synchronized in time since then the preambles appear at different time instants. Another potential solution to resolve this ambiguity is to assign different number of end marker signals to different carriers. For instance, the first base station belonging to one network transmits one end-marker signal at or close to the lower end D1 and one end-marker signal at or close to the upper end D2 of the fourth frequency range D, and further, the second base station belonging to another network transmits three end-marker signals at or close to the lower end E1 and three end-marker signals at or close to the upper end E2 of the fourth frequency range E. This would however require the different networks to negotiate the appearance of the end marker signal.

Just as the end-marker signal patterns may be different to resolve ambiguities as described above, they may also be set different hopping patterns for different operators that is different from hopping patterns used for end-marker signals of other operators, such that a specific hopping pattern of the transmitted end-marker signal is associated with a specific operator, in order to facilitate for the second node to perform a fast search for a particular operator. The operator pattern may be remembered by the second node from previous connections, or communicated by other means, for example via a SIM card in the second node. Similarly, different hopping patterns may be used to distinguish between macro and micro cells etc.

The end-marker signals may preferably be transmitted at regular intervals, e.g. in each respective preamble A4, B4 and C4 in the time frame, as depicted in FIG. 3.

The end-marker signals may preferably be given a higher output power than normally used per subcarrier of the multi carrier system. Assuming 1024 subcarriers in a system, four end-marker signals can be given a power boost of a factor of 256, i.e. about 24 dB, which should be enough even in the presence of deep frequency selective fading.

Figure 5:
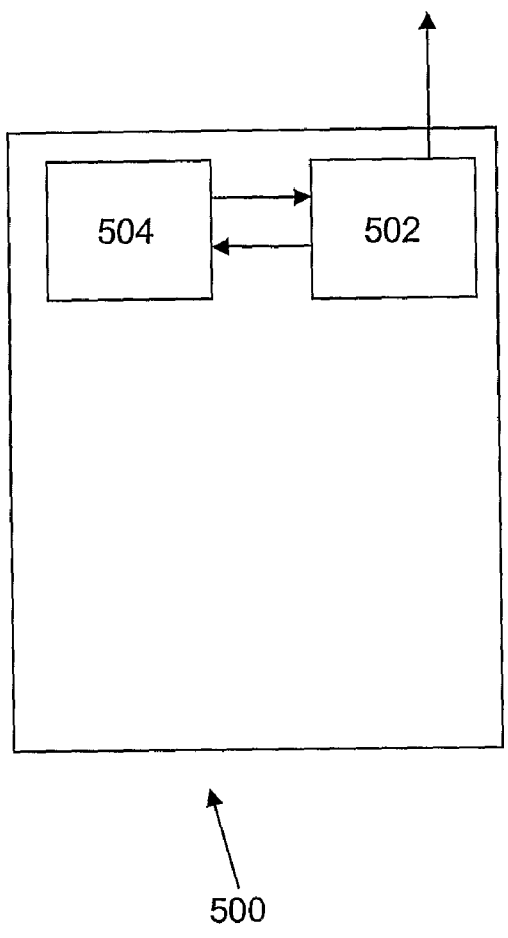
FIG. 5 is a schematic block diagram illustrating an arrangement in first node.
Figure 6:
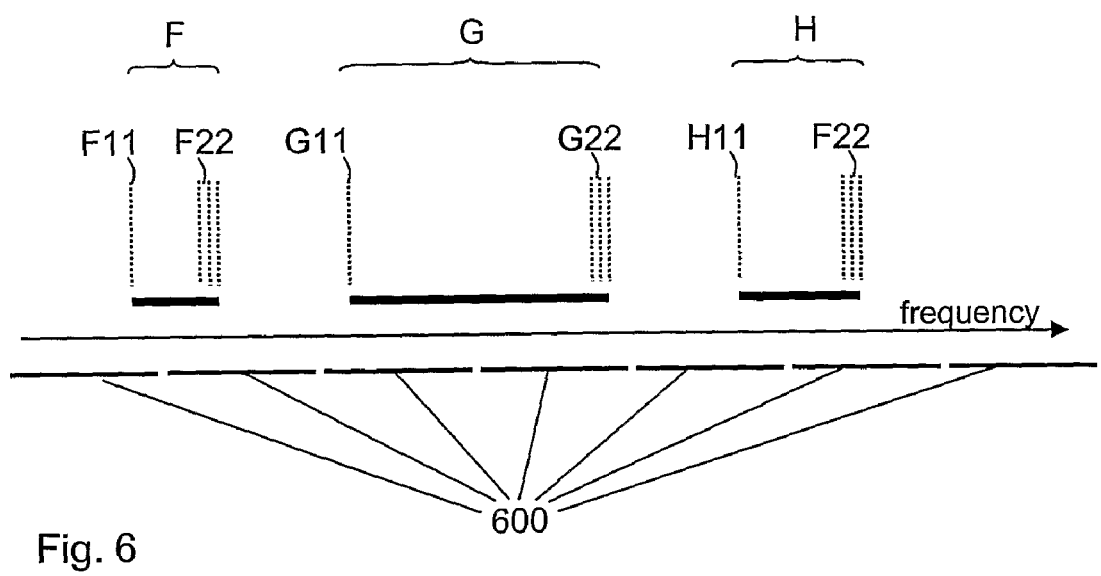
FIG. 6 is a schematic diagram illustrating another exemplary scenario of transmitting signals.

To perform the present method step in the first node 100, 214, the first node comprises an arrangement 500 as depicted in FIG. 5. The node arrangement 500 comprises a transmitter 502 adapted to transmit 120,240 an end-marker signal A11, B11, C11, D11, E11, F11, G11, H11, A22, B22, C22, D22, E22, F22, G22, H22 within or close to the frequency range. F11, G11, H11, F22, G22 and H22 are shown in FIG. 6 and will be described later on. The end-marker signal is intended to be received and used by the second node 110, 220 for identifying the frequency range of the used carrier. The node arrangement 500 further comprises a processor 504 for managing the present method step, which will be described more in detail later on.

The present method will now be described from the point of view of the second node 110, 220. FIG. 6 is a diagram illustrating an exemplary scenario wherein a first second and third radio transceivers in respective three different first nodes 100, 214, e.g. a first, second and third base stations equal to base station 214 described above but the tree different first nodes may be any other node that is equipped with a radio transceiver. The first second and third base stations operate at three different frequency bands, each of them with a respective frequency range. The first second and third base stations may belong to the same or different radio networks. In the single axis diagram in FIG. 6, the longitudinal axis indicates frequency. As said, the first second and third transceivers uses three frequency ranges (the sixth, seventh and eight exemplary frequency ranges in this document), the first base station uses a sixth frequency range F, the second base station uses a seventh frequency range G, and the third base station uses an eight frequency range H. In this example each of the first second and third base stations transmits respective, a first end-marker signal F11 at or close to the lower end and a second end-marker signal F22 at or close to the upper end of the sixth frequency range F, a first end-marker signal G11 at or close to the lower end and a second end-marker signal G22 at or close to the upper end of the seventh frequency range G and further a first end-marker signal H11 at or close to the lower end and a second end-marker signal H22 at or close to the upper end of the eight frequency range H. As in the above example and as shown in FIG. 6, the second end-marker signal F22, G22 and H22 is composed by three end-marker signals.

Occasionally, the second node 110, 220 requires searching for the frequencies that are used in the local area wherein the second node 110, 220 is located, this may happen e.g. when the second node 110, 220 is powered up or in order to ensure interruption-free connection e.g. when entering a building where there is no outdoor-to-indoor coverage, but only a private hotspot. The second node 110, 220 comprises a receiver, which receiver receives the end-marker signals F11, F22, G11, G22, H11 and H22, transmitted by the respective first, second and third base stations. To detect the received end-marker signals F11, F22, G11, G22, H11 and H22, the receiver only requires performing a rather limited set of broadband Discrete Fourier Transforms (DFTs) to scan the relevant frequency range. One possible way to detect the received end-marker signals F11, F22, G11, G22, H11 and H22 is for the second node 110, 220 to start the searching in the lower part of the possible and relevant frequency range, e.g. around 1 GHz. The scanning is then conducted around a carrier frequency. In the case of 1 GHz carrier frequency and 100 MHz DFT bandwidth the second node 110, 220 searches a frequency range that spans from 950 MHz up to 1050 MHz.

The carrier frequency is stepwise increased as soon as the DFT bandwidth is scanned. The step is typically as large as the DFT bandwidth or somewhat lower. The search continues until the entire frequency range of relevance is scanned. Each end-marker signal F11, F22, G11, G22, H11 and H22 is a candidate to an indication of an end of an available frequency band. The second node 110, 220 requires identifying the end-marker signals F11, F22, G11, G22, H11 and H22 to unravel whether the received end-marker signal F11, F22, G11, G22, H11 and H22 represents a lower or upper end of a frequency band to be identified as being used in the geographical area. The second node 110, 220 makes an assumption of an possible identified frequency range used, based on the end-marker signal candidates F11, F22, G11, G22, H11 and H22 and verifies the assumption by listening to a broadcast signal transmitted by the respective first, second and third base stations in conventional way. If a broadcast signal is found in the candidate band, the assumption has been verified. The second node 110, 220 can now continue searching for broadcast signals from other candidate bands if needed. The DFT frequency ranges 600 are shown in the diagram in FIG. 6. The number of preambles that need to pass before the search is complete can be calculated by

[total spectrum to search]/[maximum DFT frequency range].

For example, assuming frequencies in the range 1-6 GHz and a DFT range of 100 MHz, this only means 50 time frame preambles intervals. Assuming a time frame range of 10 ms, this takes up to 5 s, which is a short time compared to the 300 s in the conventional worst case scenario mentioned under "Background of the invention", It is assumed that given a correct frequency and bandwidth identification, the second node 110, 220 can quickly synchronize to the radio network 200 using the normal fine synchronization techniques. It may also be noted that the regular intervals with precise timing at which the end-marker signals F11, F22, G11, G22, H11 and H22 are transmitted should minimise the risk that the end-markers are confused with sine waves of other origins.

Figure 7:
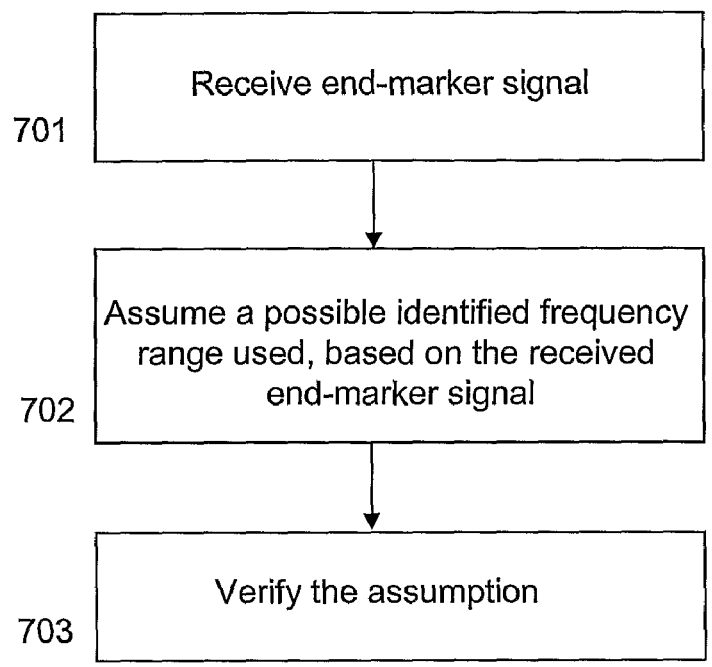
FIG. 7 is a flow chart illustrating a method in a second node.

With reference to FIG. 7 the method steps performed by the present user equipment 220 may operate in the following way. The method in FIG. 7 is only an illustrative example.

701. The second node 110, 220 receives an end-marker signal A11, B11, C11, D11, E11, F11, G11, H11, A22, B22, C22, D22, E22, F22, G22, H22 within or close to the frequency range, preferably a first end-marker signal F11, G11, H11 at or close to the lower end of the frequency range F, G, H and a second end-marker signal F22, G22, H22 at or close to the upper end of the frequency range F, G, H. The end-marker signal is received from the first node 100, 214. To detect the received end-marker signals F11, G11, H11, F22, G22, H22, the second node 110, 220 scans the frequency range of relevance by performing a set of broadband DFTs. Said scanning is performed by starting in the lower part of the relevant frequency range, and increasing the carrier frequency stepwise as soon as the DFT bandwidth is scanned and continuing until the entire frequency range of relevance is scanned.

702. The received end-marker signal F11, F22, G11, G22, H11, H22 is a candidate to an indication of an end of an available frequency band. The second node 110, 220 identifies whether received end-marker signal candidate F11, F22, G11, G22, H11, H22 represents a lower or upper end of a frequency band to be identified. In a second step the receiver makes an assumption of a possible identified frequency range used, based on the received end-marker signal candidates F11, F22, G11, G22, H11 and H22.

703. The second node 110, 220 then verifies the assumption e.g. by listening to a broadcast signal transmitted by the at least one node.

Figure 8:
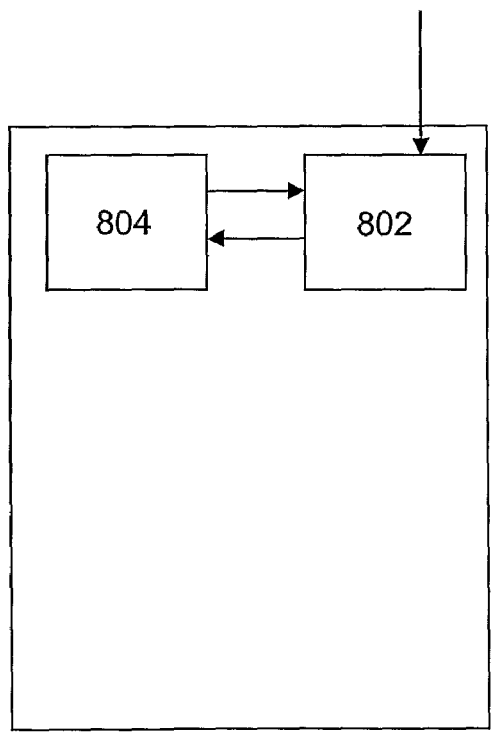
FIG. 8 is a schematic diagram illustrating an arrangement in a second node.

To perform the present method steps, the second node 110, 220 comprises an arrangement 800 as depicted in FIG. 8. The second node arrangement comprising a receiver 802 adapted to receive an end-marker signal A11, B11, C11, D11, E11, F11, G11, H11, A22, B22, C22, D22, E22, F22, G22, H22 within or close to the frequency range, which end-marker signal is transmitted by the first node 100,214 and is intended to be used by the second node 110,220 for identifying the frequency range of the used carrier.

The present carrier search managing mechanism can be implemented through one or more processors, such as the processor 504 in the first node arrangement 500 depicted in FIG. 5 and a processor 804 in the second node arrangement 800 depicted in FIG. 8, together with computer program code for performing the functions of the invention. The program code mentioned above may also be provided as a computer program product, for instance in the form of a data carrier carrying computer program code for performing the present method when being loaded into the first node 100,214 and/or the second node 110, 220. One such carrier may be in the form of a CD ROM disc. It is however feasible with other data carriers such as a memory stick. The computer program code can furthermore be provided as pure program code on a server and downloaded to first node 100, 214 and/or second node 110, 220 remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. Method for sending a signal from a first node that communicates with a second node via multi-carrier radio communication using one or more carriers associated with a frequency range, the method comprising the steps of:
   transmitting a first end-marker signal within or close to the frequency range during a preamble portion of a first frame, wherein the first end-marker signal indicates to a second node a lower end of the frequency range; and
   transmitting a second end-marker signal within or close to the frequency range during the preamble portion of the first frame or a preamble portion of a second frame, wherein the second end-marker signal indicates to the second node an upper end of the frequency range, and wherein the second end-marker signal indicating the upper end of the frequency range comprises a different signal constellation from the first end-marker signal indicating the lower end of the frequency range.

2. Method according to claim 1, wherein:
   transmitting the first end-marker signal comprises transmitting the first end-marker signal at or close to the lower end of the frequency range; and
   transmitting the second end-marker signal comprises transmitting the second end-marker signal at or close to the upper end of the frequency range.

3. Method according to claim 1, wherein the first end-marker signal comprises one single end-marker signal and the second end-marker signal comprises three end-marker signals.

4. Method according to claim 1, further comprising utilizing signal hopping by sending the first end-marker signal and the second end-marker signal at different subcarriers.

5. Method according to claim 1, wherein a specific hopping pattern is used for end marker-signals of a specific carrier that is different from hopping patterns used for end-marker signals of other carriers.

6. Method according to claim 5, wherein the first and second end-marker signals may use a predefined pseudo-random hopping sequence which associates the first end-marker signal with the second end-marker signal.

7. Method according to claim 1, wherein transmitting at least one of the first end-marker signal and the second end-marker signal comprises transmitting a specific hopping pattern of the at least one end-marker signal, wherein the specific hopping pattern is associated with a specific operator and is different from hopping patterns used for end-marker signals of other operators.

8. Method according to claim 1, wherein, different hopping patterns are used to distinguish between end marker-signals of macro and micro cells.

9. Method according to claim 1, wherein the end-marker signals are transmitted at regular intervals.

10. An apparatus comprising a first node adapted to communicate with a second node via multi-carrier radio communication wherein the first node is adapted to use one or more carriers associated with a frequency range, the apparatus comprising a transmitter configured to:
    transmit a first end-marker signal within or close to the frequency range during a preamble portion of a first frame, wherein the first end-marker signal indicates to a second node a lower end of the frequency range; and
    transmit a second end-marker signal within or close to the frequency range during the preamble portion of the first frame or a preamble portion of a second frame, wherein the second end-marker signal indicates to the second node an upper end of the frequency range, and wherein the second end-marker indicating the upper end of the frequency range comprises a different signal constellation from the first end-marker indicating the lower end of the frequency range.

11. An apparatus according to claim 10, wherein the first node is a base station, or a user terminal.

12. Method for managing a carrier search in a second node that communicates with a first node via multi-carrier radio communication using one or more carriers associated with a frequency range, the method comprising the steps of:
    receiving a first end-marker signal within or close to the frequency range during a preamble portion of a first frame, wherein the first end-marker signal indicates to the second node a lower end of the frequency range; and
    receiving a second end-marker signal within or close to the frequency range during the preamble portion of the first frame or a preamble portion of a second frame, wherein the second end-marker signal indicates to the second node an upper end of the frequency range, and wherein the second end-marker indicating the upper end of the frequency range comprises a different signal constellation from the first end-marker indicating the lower end of the frequency range.

13. Method according to claim 12, wherein:
    receiving the first end-marker signal comprises receiving the first end-marker signal at or close to the lower end of the frequency range; and
    receiving the second end-marker signal comprises receiving the second end-marker signal at or close to the upper end of the frequency range.

14. Method according to claim 12, wherein at least one of the first end-marker signal and the second end-marker signal is detected by scanning an entire frequency range of relevance by performing a set of broadband Discrete Fourier Transforms (DFTs).

15. Method according to claim 14, wherein said scanning is performed by starting in a lower part of the relevant frequency range, and increasing a carrier frequency stepwise as soon as a DFT bandwidth is scanned and continuing until the entire frequency range of relevance is scanned.

16. Method according to claim 12, wherein receiving the second end-marker signal comprises:
   identifying that the received first end-marker signal indicates a lower end of a frequency band to be identified;
   assuming a possible identified frequency range used, based on the end-marker signal candidate; and
   verifying the assumption by listening to a broadcast signal transmitted by the first node.

17. An apparatus comprising a second node adapted to communicate with a first node via multi-carrier radio communication using one or more carriers associated with a frequency range, the apparatus comprising a receiver configured to:
   receive a first end-marker signal within or close to the frequency range during a preamble portion of a first frame, wherein the first end-marker signal indicates a lower end of the frequency range; and
   receive a second end-marker signal within or close to the frequency range during the preamble portion of the first frame or a preamble portion of a second frame, wherein the second end-marker signal indicates to the second node an upper end of the frequency range, and wherein the second end-marker indicating the upper end of the frequency range comprises a different signal constellation from the first end-marker indicating the lower end of the frequency range.

18. An apparatus according to claim 17 wherein the second node is a user terminal.

* * * * *